US010708096B2

(12) United States Patent
Wang et al.

(10) Patent No.: US 10,708,096 B2
(45) Date of Patent: Jul. 7, 2020

(54) METHOD FOR DEMODULATING FREQUENCY MODULATED SIGNAL OF PMA STANDARD WIRELESS CHARGING DEVICE

(71) Applicant: WUXI CHINA RESOURCES SEMICO CO., LTD, Wuxi (CN)

(72) Inventors: Congying Wang, Wuxi (CN); Wenli Shu, Wuxi (CN); Rui Zhang, Wuxi (CN); Qiyi Zhao, Wuxi (CN)

(73) Assignee: WUXI CHINA RESOURCES SEMICO CO., LTD., Wuxi (CN)

( * ) Notice: Subject to any disclaimer, the term of this patent is extended or adjusted under 35 U.S.C. 154(b) by 0 days.

(21) Appl. No.: 16/337,513

(22) PCT Filed: Jul. 29, 2017

(86) PCT No.: PCT/CN2017/095076
§ 371 (c)(1),
(2) Date: Mar. 28, 2019

(87) PCT Pub. No.: WO2018/082356
PCT Pub. Date: May 11, 2018

(65) Prior Publication Data
US 2019/0253288 A1    Aug. 15, 2019

(30) Foreign Application Priority Data

Nov. 3, 2016   (CN) .......................... 2016 1 0954140

(51) Int. Cl.
*H04L 27/14* (2006.01)
*H04L 27/148* (2006.01)
(Continued)

(52) U.S. Cl.
CPC ......... *H04L 27/148* (2013.01); *H04B 5/0037* (2013.01); *H04L 27/16* (2013.01)

(58) Field of Classification Search
CPC .. H04B 5/0037; H04B 5/0081; H04B 5/0093; H04B 1/04; H04L 27/122; H04L 27/148; H04L 27/1566; H04L 27/14; H04L 27/156
(Continued)

(56) References Cited

U.S. PATENT DOCUMENTS 5,416,481 A * 5/1995 Chen ..................... H03M 3/328
                                                   341/131
6,417,802 B1 * 7/2002 Diesel ..................... G01S 19/26
                                                   342/357.31
(Continued)

FOREIGN PATENT DOCUMENTS

CN      105516040 A     4/2016
CN      106534015 A     3/2017

OTHER PUBLICATIONS

International Search Report dated Oct. 17, 2018 for International Application No. PCT/CN2017/095076 filed Jul. 29, 2017.

*Primary Examiner* — Emmanuel Bayard
(74) *Attorney, Agent, or Firm* — Blue Filament Law PLLC

(57) ABSTRACT

The present disclosure relates to a method for demodulating a frequency modulated signal of a PMA standard wireless charging device, including: (1) reading coil signals, sampling the coil signals, and counting cycles; (2) extracting a frequency change according to a change in a cycle count; (3) determining data according to the frequency change and a frequency duration and outputting the data; and (4) splicing the outputted data. With the method, a demodulation part does not require a complex analog circuit, and the highest frequency desired at a digital circuit part is only 4 MHz. Moreover, at this frequency, there is only a simple addition operation, and the main operating frequency is below 236 KHz.

12 Claims, 5 Drawing Sheets

(51) Int. Cl.
*H04B 5/00* (2006.01)
*H04L 27/16* (2006.01)

(58) Field of Classification Search
USPC .......................................... 375/316, 324, 334
See application file for complete search history.

(56) References Cited

U.S. PATENT DOCUMENTS

| | | | | |
|---|---|---|---|---|
| 9,225,568 | B1* | 12/2015 | Mei | H04L 27/1563 |
| 2005/0225351 | A1* | 10/2005 | Chen | H02M 3/1588 |
| | | | | 324/764.01 |
| 2007/0147544 | A1* | 6/2007 | Akahori | H04L 27/12 |
| | | | | 375/303 |
| 2008/0169872 | A1* | 7/2008 | Ghovanloo | H03D 3/006 |
| | | | | 329/300 |
| 2015/0042890 | A1* | 2/2015 | Messmer | H04N 5/20 |
| | | | | 348/725 |
| 2017/0070265 | A1* | 3/2017 | Sui | H04B 5/0075 |

\* cited by examiner

METHOD FOR DEMODULATING FREQUENCY MODULATED SIGNAL OF PMA STANDARD WIRELESS CHARGING DEVICE

CROSS-REFERENCE TO RELATED APPLICATIONS

The present application claims priority to Chinese Patent Application No. 201610954140.1, filed on Nov. 3, 2016, the content of which is incorporated herein by reference in its entirety.

TECHNICAL FIELD

The present disclosure relates to the field of wireless charging technologies, and in particular, to the field of wireless charging device communication technologies, and specifically to a method for demodulating a frequency modulated signal of a PMA standard wireless charging device.

BACKGROUND

In a PMA standard wireless charging device, its energy transmitting terminal (TX) usually sends a FSK signal at the beginning of the whole system operation, and at this time, an operating frequency of a TX signal is from 215 KHz to 220 KHz in the PMA-3 system, from 142 KHz to 158 KHz in the PMA-4 and PMA-5 systems, from 109 KHz to 121 KHz in the PMA-6 system, from 140 KHz to 158 KHz in the PMA-7 system, and from 220 KHz to 226 KHz in the PMA-8 system. Fmod is Fop+Mdepth, and a value of a cycle difference Top-Tmod between a carrier frequency Fop and a modulation frequency Fmod can be calculated to be from 96 ns to 770 ns. A piece of data is sent every 500 us, and data 1 and data 0 are sent in ways as shown in FIG. 1.

In the PMA (Power Matters Alliance) standard wireless charging device, a communication signal sent from an energy transmitting terminal to an energy receiving terminal is transmitted by means of frequency conversion, and the problem lies in that in the PMA-3, PMA-4, PMA-5, PMA-6, PMA-7, and PMA-8 standard communication protocols, a communication carrier frequency Fop of a signal sent by an energy transmitting terminal (TX) is not unique (109 KHz≤Fop≤226 KHz), and a frequency difference between Fop and Fmod is not fixed but only has a certain frequency difference range, i.e., having a modulation depth Mdepth (5 to 10 KHz), and thus the same power receiving system may need to simultaneously support the above six types of energy transmitting terminals (TX) based on different PMA protocols.

At the same time, since a signal received by an energy receiving terminal in a wireless charging system is an inductively coupled signal, the received signal is not a single frequency sinusoidal signal, and instead, it may be doped with a large amount of high frequency noise. The traditional 2 FSK demodulation methods are mainly three ways: coherent demodulation, filtering non-coherent demodulation and quadrature multiplication non-coherent demodulation.

Due to the limitation of the PMA standard communication protocol, a difference value between a carrier frequency Fop and a modulation frequency Fmod is fixed within a certain range, such that the higher the frequency of Fop is, the smaller the cycle difference between Fop and Fmod is. If demodulation is done using traditional methods, the entire system requires very high precision to distinguish different frequencies, which will greatly increases the expenditure of the entire circuit no matter an analog manner or a digital manner is achieved. At the same time, in different PMA transmission systems, the carrier frequency Fop in the communication phase is not fixed to a certain value between 110 KHz and 205 KHz (the PMA protocol only provides a range), which may greatly increase the expenditure of the entire demodulation system.

SUMMARY

An object of the present disclosure is to overcome the above-mentioned shortcomings of the prior art by providing a method for demodulating a frequency modulated signal of a PMA standard wireless charging device, which can reduce expenditure on a circuit caused by demodulation under a PMA standard communication protocol.

In order to achieve the above object, the method for demodulating a frequency modulated signal of a PMA standard wireless charging device of the present disclosure is as follows.

The main feature of the method for demodulating a frequency modulated signal of a PMA standard wireless charging device is that the method mainly includes the following steps:

(1) reading coil signals, sampling the coil signals, and counting cycles;

(2) extracting a frequency change according to a change in a cycle count;

(3) determining data according to the frequency change and a frequency duration and outputting the data; and (4) splicing the outputted data.

With the method for demodulating a frequency modulated signal of a PMA standard wireless charging device of the present disclosure, a demodulation part does not require a complex analog circuit, and the highest frequency desired at a digital circuit part is only 4 MHz. Moreover, at this frequency, there is only a simple addition operation, and the main operating frequency is below 236 KHz. Compared with an existing FSK decoding method, the method is more compatible with a PMA standard frequency modulated signal, low in costs, high in demodulation speed, easy to adjust and high in accuracy, has no requirement for a fixed Fop, and can be widely applied.

DESCRIPTION OF EMBODIMENTS

Figure 1:
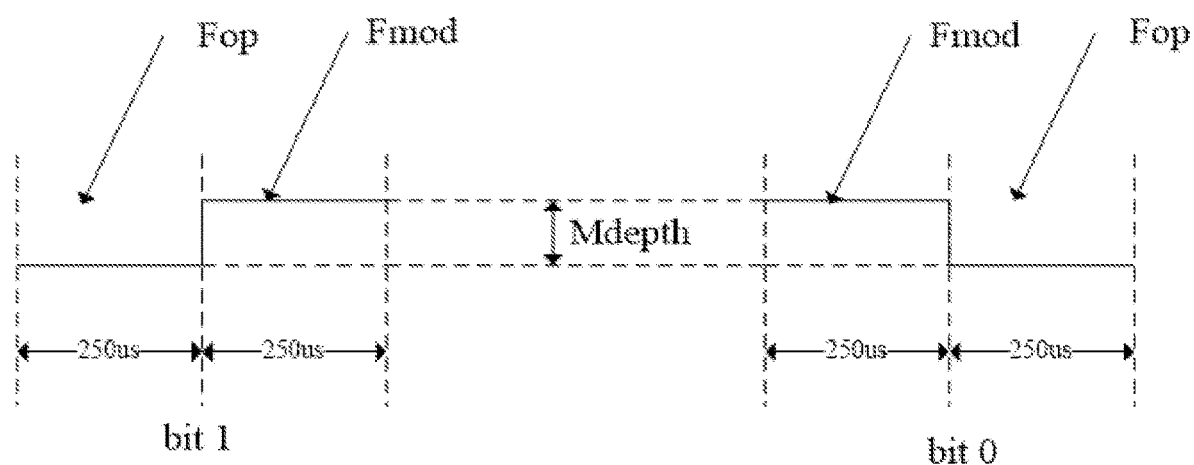
FIG. 1 is a schematic diagram of a conventional FSK signal data transmission manner.

In order to more clearly describe the technical content of the present disclosure, further description will be made below in conjunction with specific embodiments.

In a feasible implementation manner, a method for demodulating a frequency modulated signal of a PMA standard wireless charging device includes the following steps:

(1) reading coil signals, sampling the coil signals, and counting cycles;

(2) extracting a frequency change according to a change in a cycle count;

(3) determining data according to the frequency change and a frequency duration and outputting the data; and (4) splicing the outputted data.

In a preferable implementation, the step (1) specifically includes following steps:

(1-1) receiving the coil signals and comparing the coil signals with 0 level by a comparator;

(1-2) reading an outputted value of the comparator at a frequency of 4 MHz;

(1-3) filtering out a jitter waveform with a higher frequency in the outputted value of the comparator; and (1-4) counting the cycles by a cycle counter.

In a preferred implementation, said filtering out a jitter waveform with a higher frequency in the outputted value of the comparator includes:

filtering out a jitter waveform with a higher frequency in the outputted value of the comparator through a first low pass filter with a cutoff frequency of 5 kHz and a sampling frequency of 2 MHz.

In a more preferred implementation, the step (1-4) specifically includes following steps:

(1-4-1) determining whether the filtered outputted value of the comparator changes from 0 to 1, and if yes, proceeding to step (1-4-2); otherwise, proceeding to step (1-4-3);

(1-4-2) outputting a count value of the cycle counter, clearing the count value, and proceeding to step (1-1); and (1-4-3) incrementing the count value of the cycle counter by 1, and proceeding to step (1-1).

In a preferred implementation, the step (2) specifically includes the following steps:

(2-1) calculating a sum of numbers of sampling points in latest 24 cycles according to a count value of the latest cycle;

(2-2) filtering the sum of the numbers of the sampling points in the 24 cycles, and eliminating frequency jitter caused by sampling;

(2-3) counting Fop points;

(2-4) calculating sum_delta by the following formula:

$$\text{sum\_delta} = \text{out\_IIR} - \text{sum\_Fop},$$

where sum_delta is a differential result between the filtered outputted value and a currently determined Fop value sum_Fop, out_IIR is the filtered outputted value, and sum_Fop is a count value of the Fop points; and (2-5) eliminating the frequency jitter, modifying the waveform and outputting the modified waveform.

In a more preferred implementation, the step (2-1) specifically includes the following steps:

(2-1-1) determining whether the cycle counter has an outputted value, and if yes, proceeding to step (2-1-2);

(2-1-2) calculating the sum of the numbers of the sampling points in the 24 cycles according to the following formula:

$$\text{Sum}T\text{buff} = \text{Sum}T\text{buff} + T\_\text{counter} - T\text{buffer}[23],$$

where SumTbuff is the sum of the numbers of the sampling points, T_counter is the count value of the cycle counter, Tbuffer[23] is a 24th cached value of a buffer Tbuffer, and the buffer Tbuffer is used to store the outputted value of the cycle counter T_counter, the buffer Tbuffer has a depth of 24 and follows a principle of first in first out; and (2-1-2) updating the buffer Tbuffer.

In a more preferred implementation, said eliminating frequency jitter caused by sampling includes:

eliminating frequency jitter caused by sampling through a second low pass filter with a cutoff frequency of 8 kHz and a sampling frequency of 109 kHz.

In a more preferred implementation, said counting Fop points includes executing a Fop point counting operation based on a differential method and executing a Fop point counting operation based on a right shifting method, and said executing a Fop point counting operation based on a differential method specifically includes following steps:

(2-3-1) determining whether delta is 0, and if yes, proceeding to step (2-3-3), otherwise, proceeding to step (2-3-2), wherein delta is the differential result of the filtered outputted value;

(2-3-2) clearing Count_delta, wherein Count_delta is a count value when delta is 0, and proceeding to step (2-3-4);

(2-3-3) incrementing Count_delta by 1 and proceeding to step (2-3-4);

(2-3-4) determining whether Count_delta is greater than a first constant, and if yes, proceeding to step (2-3-5); and (2-3-5) clearing Count_delta, clearing Count_SumDiv4, taking a value of out_IIR as sum_Fop, and proceeding to step (2-4), wherein Count_SumDiv4 is a count value of SumDiv4, and SumDiv4 is a value obtained by right shifting the filtered outputted value by two bits.

Said executing a Fop point counting operation based on a right shifting method specifically includes following steps:

(2-3-a) determining whether a current SumDiv4 is equal to a previous SumDiv4, and if yes, proceeding to step (2-3-b), otherwise, proceeding to step (2-3-c);

(2-3-b) incrementing Count_SumDiv4 by 1 and proceeding to step (2-3-d);

(2-3-c) clearing Count_SumDiv4 and proceeding to step (2-3-d);

(2-3-d) using the current SumDiv4 to cover the previous SumDiv4;

(2-3-e) determining whether Count_SumDiv4 is greater than or equal to a second constant and whether an absolute value of sum_delta is greater than a third constant, and if yes, proceeding to step (2-3-f); and (2-3-f) clearing Count_SumDiv4, taking the value of out_IIR as sum_Fop, and proceeding to step (2-4).

In a more preferred implementation, the step (2-5) includes the following steps:

(2-5-1) determining whether an absolute value of sum_delta is smaller than or equal to a fourth constant, and if yes, proceeding to step (2-5-2), otherwise, proceeding to step (2-5-3);

(2-5-2) taking clip_sum_delta=0 as a modified sum_delta, and proceeding to step (2-5-4);

(2-5-3) modifying sum_delta in a section smaller than the fourth constant, and proceeding to step (2-5-4); and (2-5-4) outputting data of the modified sum_delta.

In a further implementation, modifying sum_delta in a section smaller than the fourth constant specifically includes following steps:

(2-5-3-1) determining whether the absolute value of sum_delta is greater than 31, and if yes, proceeding to step (2-5-3-2), otherwise, proceeding to step (2-5-3-5);

(2-5-3-2) determining whether sum_delta is greater than 0, and if yes, proceeding to step (2-5-3-3), otherwise, proceeding to step (2-5-3-4);

(2-5-3-3) taking clip_sum_delta=31 as the modified sum_delta, and proceeding to step (2-5-4);

(2-5-3-4) taking clip_sum_delta=−31 as the modified sum_delta, and proceeding to step (2-5-4); and (2-5-3-5) directly taking the value of sum_delta as clip_sum_delta, and proceeding to step (2-5-4).

In a preferred implementation, the step (3) includes the following steps:

(3-1) determining whether clip_sum_delta changes between zero and a non-zero value, and if yes, proceeding to step (3-2);

(3-2) adding a value of clk_count to a value of reg_clk_count to obtain a new reg_clk_count, and clearing clk_count, where reg_clk_count is an accumulated value of a 4 MHz clock counter, and clk_count is a count value of the 4 MHz clock counter;

(3-3) performing data determination on reg_clk_count to obtain data_bit;

(3-4) outputting data according to data_bit; and (3-5) outputting data, saving a latest bit_salve, and proceeding to step (4), wherein the outputted data is 0 or 1, bit_salve is a saved value of the data determination, and the saved value of the data determination is used to save a condition of a latest determined half cycle.

In a more preferred implementation, the step (3-3) includes the following steps:

(3-3-1) determining whether reg_clk_count is greater than or equal to a predetermined threshold value, and if yes, proceeding to step (3-3-2), otherwise, proceeding to step (3-3-3);

(3-3-2) clearing reg_clk_count, outputting a data determination result as data_bit=8, and proceeding to step (4);

(3-3-3) determining whether clip_sum_delta changes from a non-zero value to zero, and if yes, proceeding to step (3-3-4), otherwise, proceeding to step (3-3-8);

(3-3-4) determining whether reg_clk_count is greater than the threshold value const_a, and if yes, proceeding to step (3-3-5), otherwise, proceeding to step (3-3-6);

(3-3-5) skipping the determination and proceeding to step (3-4);

(3-3-6) determining whether bit_salve is equal to 3, and if yes, recording the data determination result as case a, otherwise, recording the data determination result as case b;

(3-3-7) subtracting a threshold value const_d from a value of reg_clk_count to obtain a new reg_clk_count, and proceeding to step (3-4);

(3-3-8) determining whether reg_clk_count is smaller than a threshold value const_e, and if yes, recording the data determination result as case c and proceeding to step (3-3-9), otherwise, proceeding to step (3-3-10);

(3-3-9) clearing reg_clk_count, and proceeding to step (3-4);

(3-3-10) determining whether reg_clk_count is smaller than a threshold value const_d, and if yes, proceeding to step (3-3-11), otherwise, proceeding to step (3-3-12);

(3-3-11) determining whether bit_salve is equal to 2, and if yes, recording the data determination result as case d, otherwise, recording the data determination result as case e, and proceeding to step (3-3-9);

(3-3-12) determining whether reg_clk_count is smaller than a threshold value const_c, and if yes, proceeding to step (3-3-13), otherwise, proceeding to step (3-3-15);

(3-3-13) determining whether bit_salve is equal to 2, and if yes, recording the data determination result as case f and proceeding to step (3-3-9), otherwise, proceeding to step (3-3-14);

(3-3-14) determining whether bit_salve is equal to 3, and if yes, recording the data determination result as case g, otherwise, recording the data determination result as case h, and proceeding to the step (3-3-9);

(3-3-15) determining whether reg_clk_count is smaller than the threshold value const_b, and if yes, proceeding to step (3-3-16), otherwise, recording the data determination result as case m and proceeding to the step (3-3-9);

(3-3-16) determining whether bit_salve is equal to 2, and if yes, recording the data determination result as case j and proceeding to the step (3-3-9), otherwise, proceeding to step (3-3-17); and (3-3-17) determining whether bit_salve is equal to 3, and if yes, recording the data determination result as case k, otherwise, recording the data determination result as case 1, and proceeding to the step (3-3-9).

In a preferable implementation, the step (3-4) includes the following steps:

(3-4-1) determining whether data_bit is equal to 8, and if yes, proceeding to step (3-4-2), otherwise, proceeding to step (3-4-3);

(3-4-2) clearing reg_clk_count;

(3-4-3) determining a value of data_bit; and (3-4-4) ascertaining the outputted data according to the value of data_bit, saving a latest bit_salve, the outputted data being 0 or 1, and proceeding to step (4).

Figure 2:
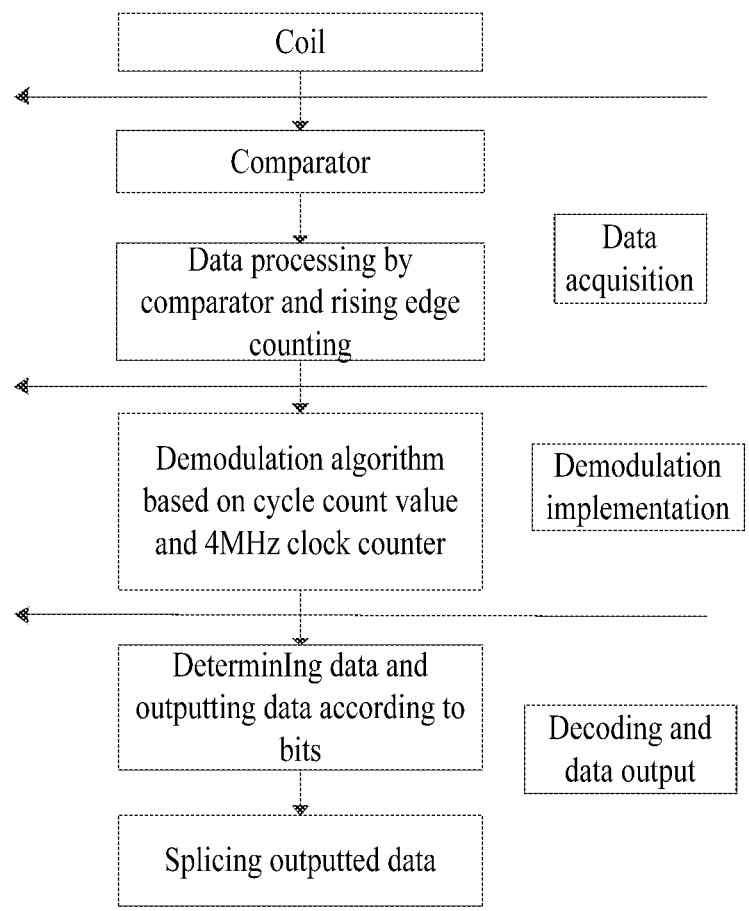
FIG. 2 is a schematic diagram of a process of a method for demodulating a frequency modulated signal of a PMA standard wireless charging device according to the present disclosure.

The disclosure abandons the conventional practice of the traditional 2FSK coherent demodulation and non-coherent demodulation, and according to the characteristics of the frequency modulation communication signal in the PMA standard, the analog circuit part uses only one comparator to replace the ADC sampling circuit, and at the same time, the digital part can achieve demodulation of the FSK signal only by using a clock frequency of 4 MHz. The implementation process of the present disclosure is as shown in FIG. 2.

In a medium power wireless charging communication protocol, since the method in which a transmitting terminal generates a sinusoidal wave is controlled by PWM, this method makes it easier to control the frequency and duty cycle of the outputted signal and also causes the signal spectrum to be complex, which cannot be demodulated by the general FSK method. Since the duty cycle of the PWM modulation method is changing while its cycle is fixed and unchanged, the present design obtains coded data by detecting the number of points in the signal cycle and processing the number of the points as a signal. This algorithm fixes a sum of 24 cycles as a processing object, and outputs the sum of the most recent 24 cycle counts every time an end of one cycle is detected. Then, data determination is executed based on the change trend of the sum value in combination with a 4 MHz clock counter.

Figure 3:
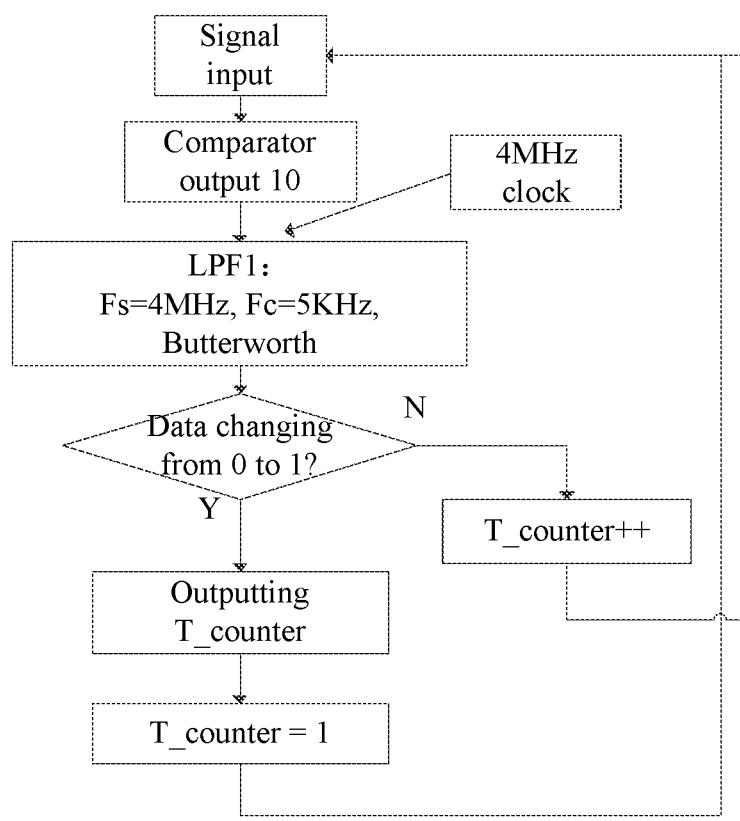
FIG. 3 is a flowchart of a data acquisition process of a method for demodulating a frequency modulated signal of a PMA standard wireless charging device according to the present disclosure.

1) Data acquisition and processing of the number of points in the cycle:

After the signal on the coil enters into the chip and is compared with the 0 level by a comparator, the outputted value of the comparator is read at 4 MHz. The value can be regarded as 1 bit sampling data of 4 MHz. In order to ensure that the jitter of the waveform of the input signal will not affect the subsequent decoding algorithm, a low pass filter is applied to the data firstly so as to filter out the jitter waveform of higher frequency, and then demodulation and decoding processing is executed. The data acquisition process is shown in FIG. 3.

The following is a name of a variable and meaning it represents in the decoding process:

T_counter—a cycle counter having a length of Gbit, which counts at a fixed frequency, outputs data at each rising edge and then clears to recount, without considering overflow issues during the counting process.

Figure 4:
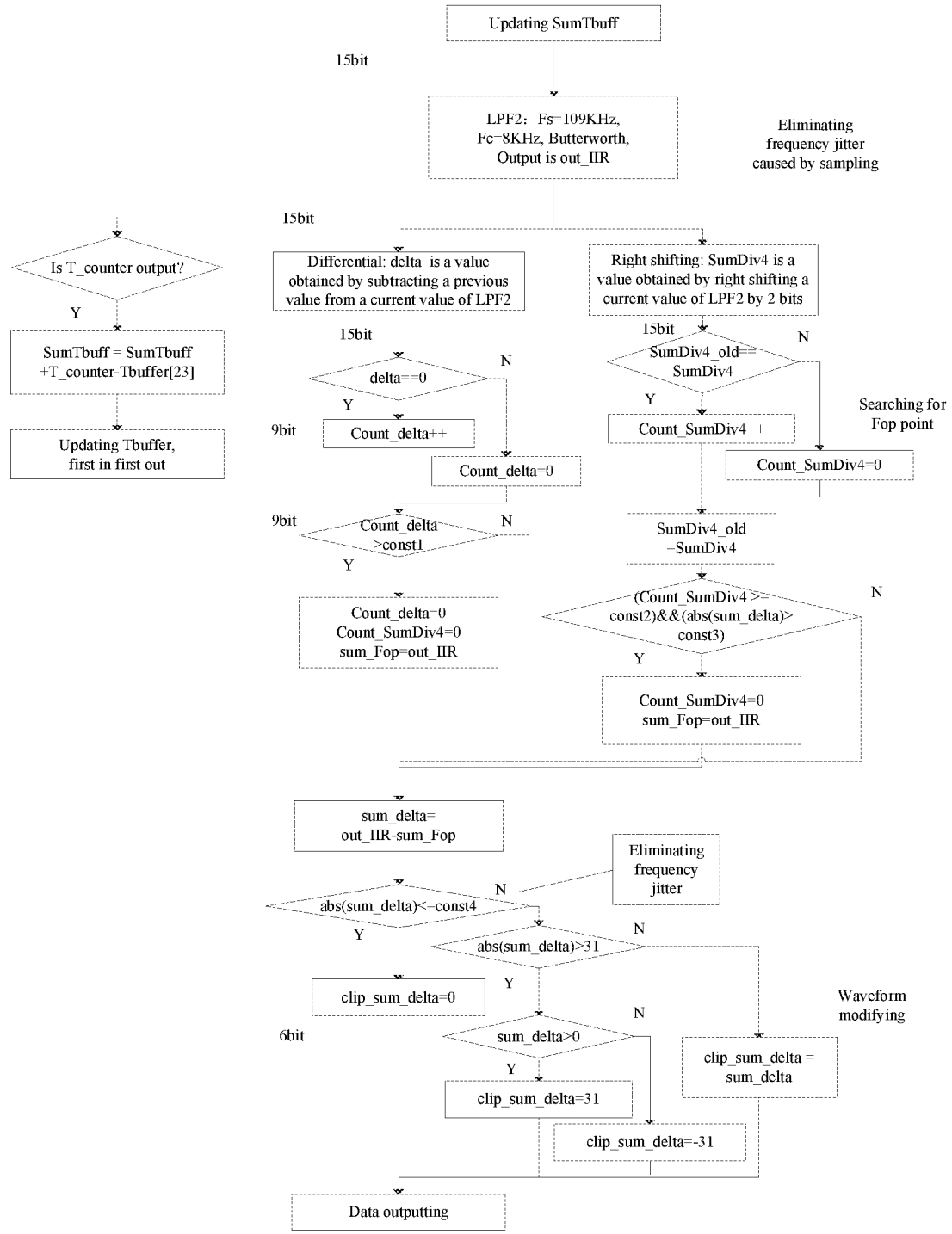
FIG. 4 is a flowchart of extracting a frequency change of a method for demodulating a frequency modulated signal of a PMA standard wireless charging device according to the present disclosure.

2) Extracting the frequency change according to the change in the sum of numbers of points in cycles:

the flowchart is shown in FIG. 4.

Parameters will be described as follows:

const1, const2, const3, const4—constants involved in the algorithm;

Tbuffer—a cycle count buffer, which is used for saving an outputted value of T_counter has a depth of 23, first in first out;

SumTbuff—a sum of members of the cycle count buffer, 15 bit, having an initial value of 0;

delta—a differential result of outputted values by LPF2;

Count_delta—a counter when a delta value is 0, which accumulates when delta is 0 and clears when there is a change;

sum_delta—a difference between the sum values, indicating a difference between a value currently outputted by the filter and a current Fop value; and clip_sum_delta—modified sum_delta data.

If the counter T_counter has an output, a sum of numbers of points of the latest 24 cycles is calculated first, and then the outputted value is stored in the cycle count buffer. After that, the subsequent processing is executed by taking a sum of members of the cycle count buffer—SumTbuff as an object.

SumTbuff is the sum of numbers of points of 23 cycles. Due to sampling and interference, SumTbuff data will inevitably fluctuate even in the case of a single-frequency signal. Here, SumTbuff is used as an input signal, and a fluctuation of the sum of the numbers of the points can be regarded as a noise at a higher frequency.

Therefore, in the whole process, the fluctuation part of the sum of the numbers of the points in the SumTbuff is first smoothed by a low pass filter LPF2.

The smoothed SumTbuff curve reflects a change in frequency, which is differentiated at this time. Meanwhile, the differential signal is subjected to a series of processing as shown in FIG. 4, so as to eliminate the jitter and offset in the sum value with only the change value left for use in determination.

Figure 5:
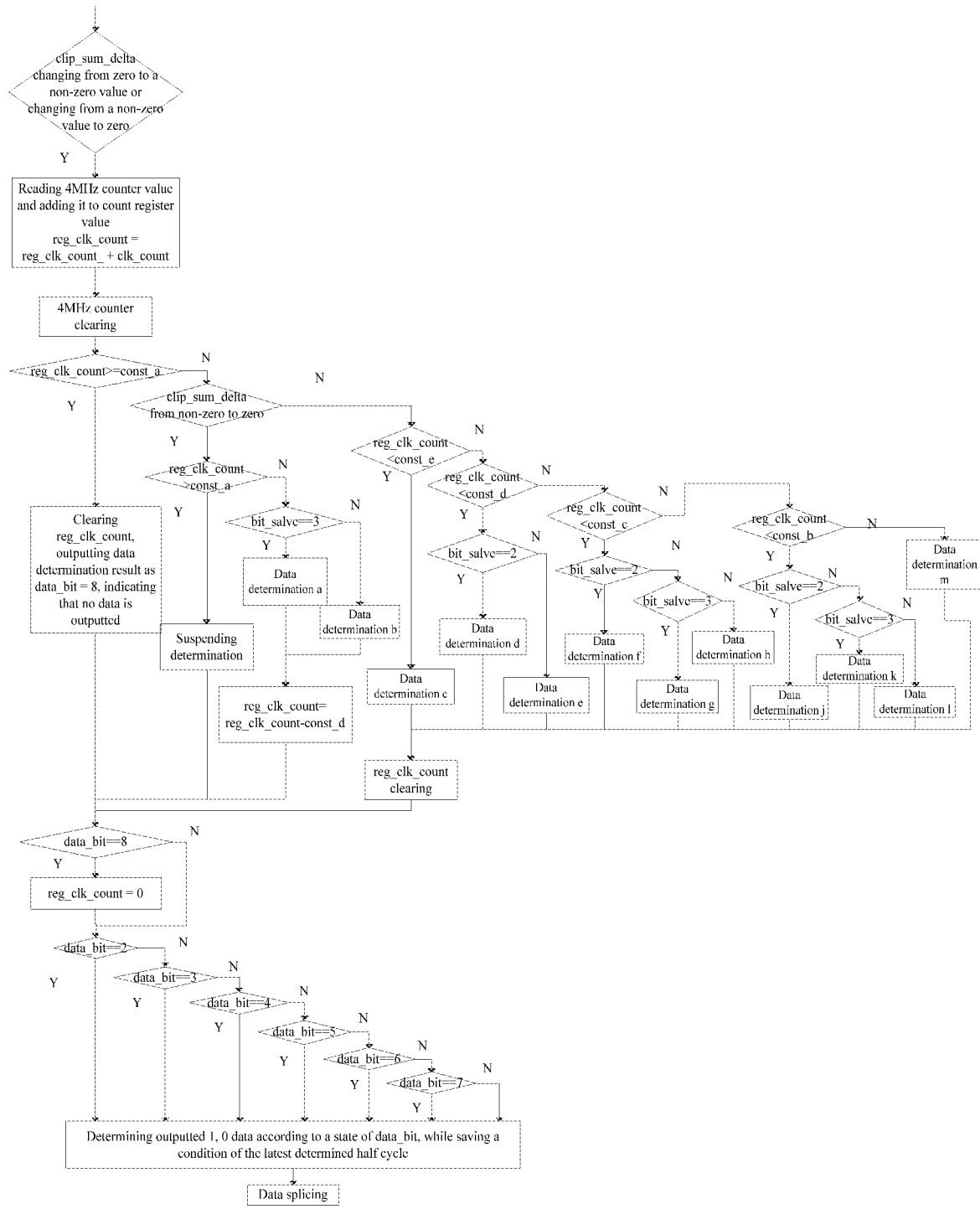
FIG. 5 is a flowchart of data determination of a method for demodulating a frequency modulated signal of a wireless charging device according to the present disclosure.

3) Executing data determination according to the curve of the change in the sum of the numbers of the points of the cycles and the 4 MHz clock counter:

The flowchart is shown in FIG. 5. The outputted data in FIG. 4 is a sinusoidal-like waveform, and a 4 MHz clock count value between 2 zeros and non-zero transition points (zero to non-zero and non-zero to zero) is used as a basis for data determination. In the 4 MHz clock counter, the clock is continuously counting, and the count value is fetched every time at the 0 and non-zero transition points of clip_sum_delta and then the count is restarted.

Parameters will be described as follows:

const_a, const_b, const_c, const_d, const_e—threshold values of a 4 MHz clock counter involved in the algorithm;

clip_sum_delta—an output of a cycle point number processing module;

clk_count—a 4 MHz clock counter;

reg_clk_count—an output register of a 4 MHz counter;

data_bit—0 indicating that 0 is detected, 1 indicating that 1 is detected, 2 indicating that fop+fmod+fop is detected, 3 indicating that fmod+fop+fop is detected, 4 indicating that fop+fmod+fop is detected, 5 indicating that fmod+fop+long fop is detected, 6 indicating that fop+fmod+long fop is detected, 7 indicating that the processing is suspending, and 8 indicating that an error is detected; and bit_salve—a data determination saving value for saving the latest determined half cycle, 2 indicating fop, 3 indicating fmod, and 0 and 1 indicating that the previous data has been determined.

According to the disclosure, a demodulation part does not require a complex analog circuit, and the highest frequency desired at a digital circuit part is only 4 MHz. Moreover, at this frequency, there is only a simple addition operation, and the main operating frequency is below 236 KHz. Compared with an existing FSK decoding method, the method is more compatible with a PMA standard frequency modulated signal, low in costs, high in demodulation speed, easy to adjust and high in accuracy, has no requirement for a fixed Fop, and can be widely applied.

In this specification, the disclosure has been described with reference to specific embodiments thereof. However, it will be apparent that various modifications and changes can be made without departing from the scope of the disclosure. Accordingly, the specification and drawings should be regarded as illustrative rather than limiting.

What is claimed is:

1. A method for demodulating a frequency modulated signal of a PMA standard wireless charging device, wherein the method comprises following steps:
    (1) reading coil signals, sampling the coil signals, and counting cycles;
    (2) extracting a frequency change according to a change in a cycle count;
    (3) determining data according to the frequency change and a frequency duration and outputting the data; and
    (4) splicing the outputted data, and
    wherein the step (2) comprises the following steps:
        (2-1) calculating a sum of numbers of sampling points in a latest 24 cycles according to a count value of the latest cycle;
        (2-2) filtering the sum of the numbers of the sampling points in the 24 cycles, and eliminating frequency jitter caused by sampling;
        (2-3) counting Fop points;
        (2-4) calculating sum_delta by the following formula:

$$\text{sum\_delta}=\text{out\_IIR}-\text{sum\_Fop},$$

where sum_delta is a differential result between the filtered outputted value and a currently determined Fop value sum_Fop, out_IIR is the filtered outputted value, and sum_Fop is a count value of the Fop points; and
        (2-5) eliminating the frequency jitter, modifying the waveform and outputting the modified waveform.

2. The method for demodulating a frequency modulated signal of a PMA standard wireless charging device according to claim 1, wherein the step (1) further comprises the following steps:
    (1-1) receiving the coil signals and comparing the coil signals with a 0 level by a comparator;
    (1-2) reading an outputted value of the comparator at a frequency of 4 MHz;
    (1-3) filtering out a jitter waveform with a higher frequency in the outputted value of the comparator; and
    (1-4) counting the cycles by a cycle counter.

3. The method for demodulating a frequency modulated signal of a PMA standard wireless charging device according to claim 2, wherein said filtering out a jitter waveform with a higher frequency in the outputted value of the comparator comprises:
    filtering out a jitter waveform with a higher frequency in the outputted value of the comparator through a first low pass filter with a cutoff frequency of 5 kHz and a sampling frequency of 2 MHz.

4. The method for demodulating a frequency modulated signal of a PMA standard wireless charging device according to claim 2, wherein the step (1-4) further comprises the following steps:
(1-4-1) determining whether the filtered outputted value of the comparator changes from 0 to 1, and if yes, proceeding to step (1-4-2); otherwise, proceeding to step (1-4-3);
(1-4-2) outputting a count value of the cycle counter, clearing the count value, and proceeding to step (1-1); and
(1-4-3) incrementing the count value of the cycle counter by 1, and proceeding to step (1-1).

5. The method for demodulating a frequency modulated signal of a PMA standard wireless charging device according to claim 1, wherein the step (2-1) further specifically comprises the following steps:
(2-1-1) determining whether the cycle counter has an outputted value, and if yes, proceeding to step (2-1-2);
(2-1-2) calculating the sum of the numbers of the sampling points in the 24 cycles according to the following formula:

$$SumTbuff = SumTbuff + T\_counter - Tbuffer[23],$$

where SumTbuff is the sum of the numbers of the sampling points, T_counter is the count value of the cycle counter, Tbuffer[23] is a $24^{th}$ cached value of a buffer Tbuffer, and the buffer Tbuffer is used to store the outputted value of the cycle counter T_counter, the buffer Tbuffer has a depth of 24 and follows a principle of first in first out; and
(2-1-2) updating the buffer Tbuffer.

6. The method for demodulating a frequency modulated signal of a PMA standard wireless charging device according to claim 1, wherein said eliminating frequency jitter caused by sampling comprises:
eliminating frequency jitter caused by sampling through a second low pass filter with a cutoff frequency of 8 kHz and a sampling frequency of 109 kHz.

7. The method for demodulating a frequency modulated signal of a PMA standard wireless charging device according to claim 1, wherein said counting Fop points comprises executing a Fop point counting operation based on a differential method and executing a Fop point counting operation based on a right shifting method, and said executing a Fop point counting operation based on a differential method further comprises the following steps:
(2-3-1) determining whether delta is 0, and if yes, proceeding to step (2-3-3), otherwise, proceeding to step (2-3-2), wherein delta is a differential result of the filtered outputted value;
(2-3-2) clearing Count_delta, wherein Count_delta is a count value when delta is 0, and proceeding to step (2-3-4);
(2-3-3) incrementing Count_delta by 1 and proceeding to step (2-3-4);
(2-3-4) determining whether Count_delta is greater than a first constant, and if yes, proceeding to step (2-3-5); and
(2-3-5) clearing Count_delta, clearing Count_SumDiv4, taking a value of out_IIR as sum_Fop, and proceeding to step (2-4), where Count_SumDiv4 is a count value of SumDiv4, and SumDiv4 is a value obtained by right shifting the filtered outputted value by two bits; and wherein said executing a Fop point counting operation based on a right shifting method further comprises the following steps:
(2-3-a) determining whether a current SumDiv4 is equal to a previous SumDiv4, and if yes, proceeding to step (2-3-b), otherwise, proceeding to step (2-3-c);
(2-3-b) incrementing Count_SumDiv4 by 1 and proceeding to step (2-3-d);
(2-3-c) clearing Count_SumDiv4 and proceeding to step (2-3-d);
(2-3-d) using the current SumDiv4 to cover the previous SumDiv4;
(2-3-e) determining whether Count_SumDiv4 is greater than or equal to a second constant and whether an absolute value of sum_delta is greater than a third constant, and if yes, proceeding to step (2-3-f); and
(2-3-f) clearing Count_SumDiv4, taking the value of out_IIR as sum_Fop, and proceeding to step (2-4).

8. The method for demodulating a frequency modulated signal of a PMA standard wireless charging device according to claim 1, wherein the steps (2-5) comprise the following:
(2-5-1) determining whether an absolute value of sum_delta is smaller than or equal to a fourth constant, and if yes, proceeding to step (2-5-2), otherwise, proceeding to step (2-5-3);
(2-5-2) taking clip_sum_delta=0 as a modified sum_delta, and proceeding to step (2-5-4);
(2-5-3) modifying sum_delta in a section smaller than the fourth constant, and proceeding to step (2-5-4); and
(2-5-4) outputting data of the modified sum_delta.

9. The method for demodulating a frequency modulated signal of a PMA standard wireless charging device according to claim 8, wherein said modifying sum_delta in a section smaller than the fourth constant further comprises the following steps:
(2-5-3-1) determining whether the absolute value of sum_delta is greater than 31, and if yes, proceeding to step (2-5-3-2), otherwise, proceeding to step (2-5-3-5);
(2-5-3-2) determining whether sum_delta is greater than 0, and if yes, proceeding to step (2-5-3-3), otherwise, proceeding to step (2-5-3-4);
(2-5-3-3) taking clip_sum_delta=31 as the modified sum_delta, and proceeding to step (2-5-4);
(2-5-3-4) taking clip_sum_delta=−31 as the modified sum_delta, and proceeding to step (2-5-4); and
(2-5-3-5) directly taking the value of sum_delta as clip_sum_delta, and proceeding to step (2-5-4).

10. The method for demodulating a frequency modulated signal of a PMA standard wireless charging device according to claim 1, wherein the step (3) comprises the following steps:
(3-1) determining whether clip_sum_delta changes between zero and a non-zero value, and if yes, proceeding to step (3-2);
(3-2) adding a value of clk_count to a value of reg_clk_count to obtain a new reg_clk_count, and clearing clk_count, where reg_clk_count is an accumulated value of a 4 MHz clock counter, and clk_count is a count value of the 4 MHz clock counter;
(3-3) performing data determination on reg_clk_count to obtain data_bit;
(3-4) outputting data according to data_bit; and
(3-5) outputting data, saving a latest bit_salve, and proceeding to step (4), wherein the outputted data is 0 or 1, bit_salve is a saved value of the data determination, and the saved value of the data determination is used to save a condition of a latest determined half cycle.

11. The method for demodulating a frequency modulated signal of a PMA standard wireless charging device according to claim 10, wherein the step (3-3) comprises the following steps:

(3-3-1) determining whether reg_clk_count is greater than or equal to a predetermined threshold value, and if yes, proceeding to step (3-3-2), otherwise, proceeding to step (3-3-3);

(3-3-2) clearing reg_clk_count, outputting a data determination result as data_bit=8, and proceeding to step (4);

(3-3-3) determining whether clip_sum_delta changes from a non-zero value to zero, and if yes, proceeding to step (3-3-4), otherwise, proceeding to step (3-3-8);

(3-3-4) determining whether reg_clk_count is greater than a threshold value const_a, and if yes, proceeding to step (3-3-5), otherwise, proceeding to step (3-3-6);

(3-3-5) skipping the determination and proceeding to step (3-4);

(3-3-6) determining whether bit_salve is equal to 3, and if yes, recording the data determination result as case a, otherwise, recording the data determination result as case b;

(3-3-7) subtracting a threshold value const_d from a value of reg_clk_count to obtain a new reg_clk_count, and proceeding to step (3-4);

(3-3-8) determining whether reg_clk_count is smaller than a threshold value const_e, and if yes, recording the data determination result as case c and proceeding to step (3-3-9), otherwise, proceeding to step (3-3-10);

(3-3-9) clearing reg_clk_count, and proceeding to step (3-4);

(3-3-10) determining whether reg_clk_count is smaller than a threshold value const_d, and if yes, proceeding to step (3-3-11), otherwise, proceeding to step (3-3-12);

(3-3-11) determining whether bit_salve is equal to 2, and if yes, recording the data determination result as case d, otherwise, recording the data determination result as case e, and proceeding to step (3-3-9);

(3-3-12) determining whether reg_clk_count is smaller than a threshold value const_c, and if yes, proceeding to step (3-3-13), otherwise, proceeding to step (3-3-15);

(3-3-13) determining whether bit_salve is equal to 2, and if yes, recording the data determination result as case f and proceeding to step (3-3-9), otherwise, proceeding to step (3-3-14);

(3-3-14) determining whether bit_salve is equal to 3, and if yes, recording the data determination result as case g, otherwise, recording the data determination result as case h, and proceeding to the step (3-3-9);

(3-3-15) determining whether reg_clk_count is smaller than the threshold value const_b, and if yes, proceeding to step (3-3-16), otherwise, recording the data determination result as case m and proceeding to the step (3-3-9);

(3-3-16) determining whether bit_salve is equal to 2, and if yes, recording the data determination result as case j and proceeding to the step (3-3-9), otherwise, proceeding to step (3-3-17); and (3-3-17) determining whether bit_salve is equal to 3, and if yes, recording the data determination result as case k, otherwise, recording the data determination result as case 1, and proceeding to the step (3-3-9).

12. The method for demodulating a frequency modulated signal of a PMA standard wireless charging device according to claim 10, wherein the step (3-4) comprises the following steps:

(3-4-1) determining whether data_bit is equal to 8, and if yes, proceeding to step (3-4-2), otherwise, proceeding to step (3-4-3);

(3-4-2) clearing reg elk_count;

(3-4-3) determining a value of data_bit; and (3-4-4) ascertaining the outputted data according to the value of data_bit, saving a latest bit_salve, the outputted data being 0 or 1, and proceeding to step (4).

* * * * *